US009009185B2

(12) United States Patent
Bakalov

(10) Patent No.: US 9,009,185 B2
(45) Date of Patent: *Apr. 14, 2015

(54) SCALABLE PERFORMANCE MANAGEMENT SYSTEM

(75) Inventor: Vesselin Bakalov, Newark, DE (US)

(73) Assignee: Sevone, Inc., Newark, DE (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/979,934

(22) Filed: Dec. 28, 2010

(65) Prior Publication Data

US 2012/0166430 A1  Jun. 28, 2012

(51) Int. Cl.
| G06F 17/00 | (2006.01) |
| G06F 17/30 | (2006.01) |
| G06F 11/30 | (2006.01) |
| G06F 11/34 | (2006.01) |
| H04L 12/26 | (2006.01) |

(52) U.S. Cl.
CPC ............ G06F 11/3409 (2013.01); G06F 17/30 (2013.01); G06F 11/3006 (2013.01); G06F 11/3072 (2013.01); H04L 43/065 (2013.01)

(58) Field of Classification Search
CPC .......... G06F 17/30; G06F 15/16; G06F 11/30
USPC ............... 709/203–206, 215–220, 242, 238; 702/177–188; 370/396–402; 714/47.2, 714/46, 47.3; 717/154–156; 707/694, 736, 707/754, 758, 763, 766, 805
See application file for complete search history.

(56) References Cited

U.S. PATENT DOCUMENTS

| 5,751,964 | A | * | 5/1998 | Ordanic et al. ............... 709/224 |
| 6,148,335 | A | * | 11/2000 | Haggard et al. ............... 709/224 |
| 6,449,739 | B1 | * | 9/2002 | Landan ........................ 714/47.2 |
| 6,975,963 | B2 | * | 12/2005 | Hamilton et al. ............. 702/182 |
| 7,143,153 | B1 | * | 11/2006 | Black et al. ................... 709/223 |
| 7,263,560 | B2 | | 8/2007 | Abdelaziz et al. |
| 7,363,370 | B2 | | 4/2008 | Collazo |
| 7,478,151 | B1 | * | 1/2009 | Maiocco et al. ............... 709/223 |
| 7,509,343 | B1 | * | 3/2009 | Washburn et al. ..................... 1/1 |

(Continued)

FOREIGN PATENT DOCUMENTS

| JP | 2012-507797 | | 3/2012 |
| WO | WO 01/03378 | * | 1/2001 |

(Continued)

OTHER PUBLICATIONS

NetScout Systems, Inc, "NetFlow and nGenius® Performance Manager for NetFlow", 2007, pp. 1-7.*

(Continued)

*Primary Examiner* — Srirama Channavajjala
(74) *Attorney, Agent, or Firm* — Baker & Hostetler LLP

(57) ABSTRACT

A performance management system leverages an iterative process to provide performance reports, with reduced computing resources. In response to a request for a performance report, a respective subset of performance data records may be received from each of a plurality of sources. It may then be determined whether additional performance data records are to be requested from the plurality of sources for the report. The received data may be processed and the resultant report may be outputted. For example, the iterative process may be applied to generate a top-n report based on network flow performance data in a computer information system.

19 Claims, 9 Drawing Sheets

(56) References Cited

U.S. PATENT DOCUMENTS

| | | | |
|---|---|---|---|
| 7,562,134 B1* | 7/2009 | Fingerhut et al. | 709/224 |
| 8,744,806 B2* | 6/2014 | Bakalov | 702/186 |
| 2003/0079160 A1* | 4/2003 | McGee et al. | 714/39 |
| 2003/0086425 A1* | 5/2003 | Bearden et al. | 370/392 |
| 2004/0044727 A1 | 3/2004 | Abdelaziz et al. | |
| 2004/0088405 A1* | 5/2004 | Aggarwal | 709/224 |
| 2004/0186829 A1* | 9/2004 | Suzuki et al. | 707/3 |
| 2005/0055322 A1 | 3/2005 | Masters et al. | |
| 2005/0060562 A1* | 3/2005 | Bhattacharya et al. | 713/200 |
| 2005/0219151 A1* | 10/2005 | Li et al. | 345/7 |
| 2005/0268152 A1* | 12/2005 | Yamaguchi et al. | 714/4 |
| 2007/0022327 A1 | 1/2007 | Otsuka et al. | |
| 2007/0039009 A1 | 2/2007 | Collazo | |
| 2007/0043703 A1* | 2/2007 | Bhattacharya et al. | 707/3 |
| 2007/0150235 A1* | 6/2007 | Lev-Ami et al. | 702/182 |
| 2007/0185990 A1* | 8/2007 | Ono et al. | 709/224 |
| 2007/0266045 A1* | 11/2007 | Bansal et al. | 707/104.1 |
| 2008/0098365 A1* | 4/2008 | Kumar | 717/131 |
| 2009/0144696 A1* | 6/2009 | Andersen | 717/109 |
| 2010/0080129 A1* | 4/2010 | Strahan et al. | 370/242 |
| 2010/0106459 A1 | 4/2010 | Bakalov et al. | |
| 2012/0124070 A1* | 5/2012 | Mishra et al. | 707/767 |

FOREIGN PATENT DOCUMENTS

| | | | |
|---|---|---|---|
| WO | WO 03/034261 | | 4/2003 |
| WO | WO 03/107190 | * | 12/2003 |
| WO | WO 2004/001555 | | 12/2003 |
| WO | WO 2008/090110 | * | 7/2008 |
| WO | WO 2009088764 | * | 7/2009 |
| WO | WO 2010/053782 | | 5/2010 |

OTHER PUBLICATIONS

International Patent Application No. PCT/US2011/066502: International Search Report and Written Opinion dated May 11, 2012, 12 pages.

Liu et al., "pMeasure: A Tool for Measuring the Internet", Proceedings of the 2$^{nd}$ Workshop on End-To-End Monitoring Techniques and Services, E2EMON, Oct. 2004, 1-7.

Liu et al., "pMeasure: A Peer-to-Peer Measurement Infrastructure for the Internet", Computer Communications, Elsevier Science Publishers BV, Jun. 19, 2006, 29(10), 1665-1674.

Srinivasan et al., "Network Measurement as a Cooperative Enterprise", Networking and Telecommunications Group College of Computing, (no month available) 2002, 2429, 1-5.

* cited by examiner

SCALABLE PERFORMANCE MANAGEMENT SYSTEM

BACKGROUND

Computer information systems typically include multiple computing devices. The computing devices may include workstation computers, network equipment, server computers, and the like. The computing devices may generate performance data. For example, a computing device may generate a series of time-stamped data points indicative of Central Processing Unit (CPU) usage. Computing device, such as routers, may generate a data indicative of network traffic volume. And, computing devices, such as storage devices and file servers, may generate data indicative of consumed storage volume and available storage space.

Performance management systems collect and process performance data. The performance data may be used to troubleshoot past incidents, to report on present performance, and to plan for future growth. For example, granular past performance data may be used to identify a root cause of a network outage. Performance data indicative of present performance may be used to demonstrate compliance with service-level agreements (SLAs).

Report generation by performance management systems reflects a difficult computing problem that involves processing large quantities of performance data. For example, generating a report that combines information from multiple sources, such as a Netflow top-n report for example, may invoke great complexity and significant computing resources, such as memory space and processor time.

SUMMARY

The performance management system, disclosed herein, leverages an iterative process to provide performance reports, with reduced computing resources.

In response to a request for a performance report, a respective subset of performance data records may be received from each of a plurality of sources. It may then be determined whether additional performance data records are to be requested from the plurality of sources for the report. For example, the determination may be based on whether any remaining data at each of the plurality of sources may be included in the report and/or whether it is possible that that any remaining data at each of the plurality of sources will be included in the report.

The received data may be processed, and the resultant report may be outputted.

DETAILED DESCRIPTION

Figure 1A:
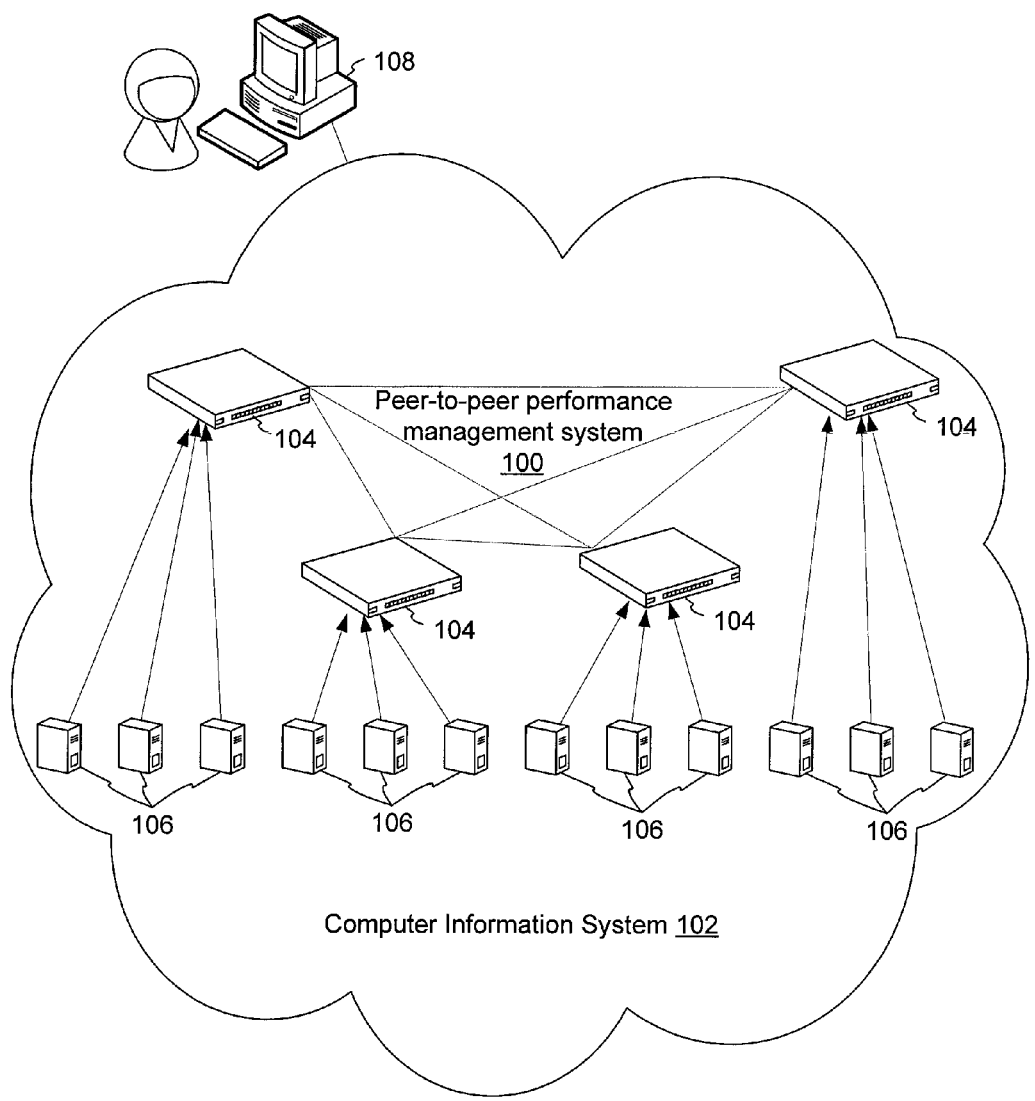
FIGS. 1a-c are block diagrams of example performance management systems.
Figure 1B:
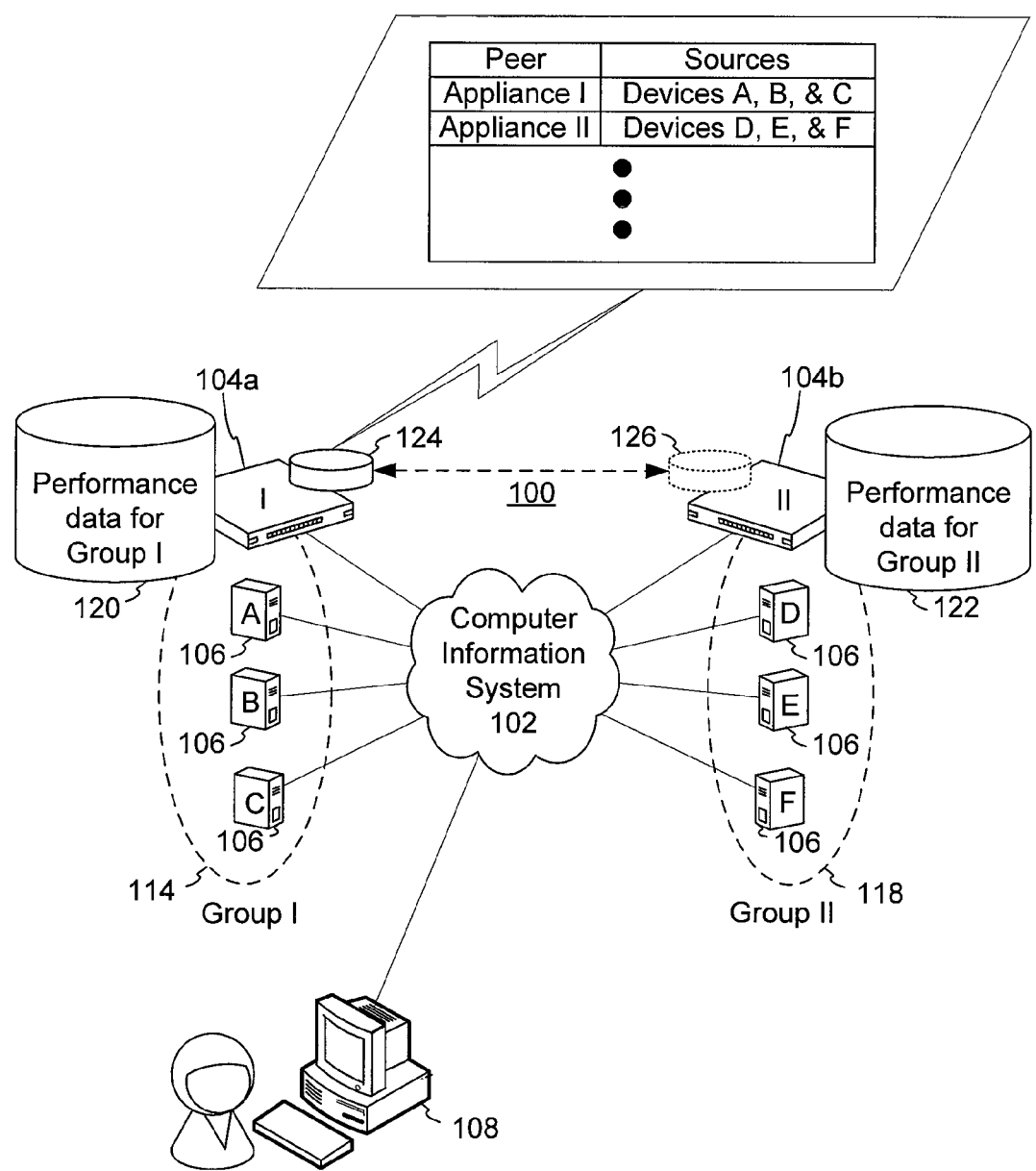
Figure 2:
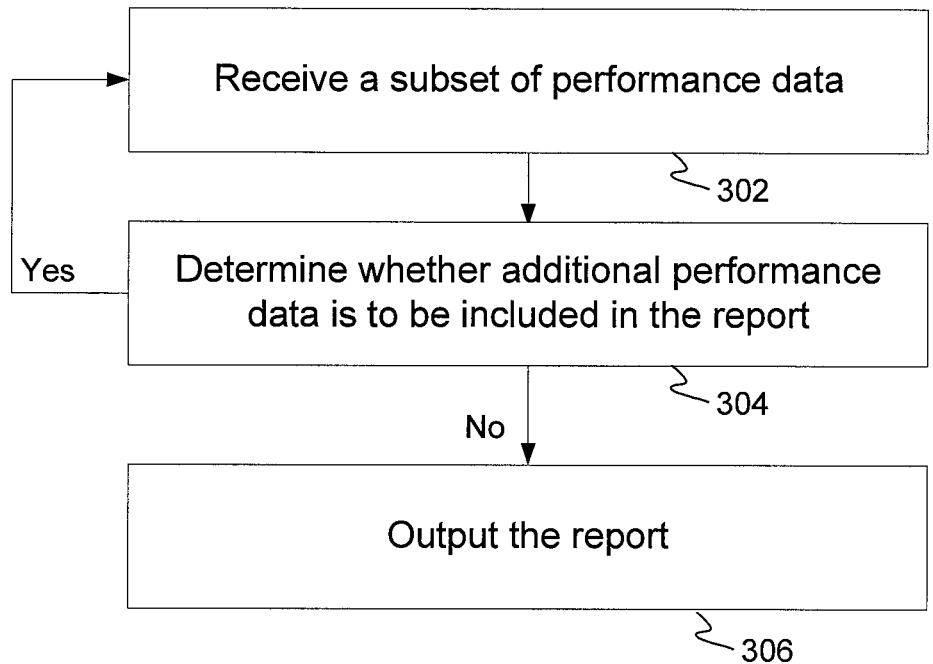
FIG. 2 is a flow chart of an example process for generating a report.
Figure 3:
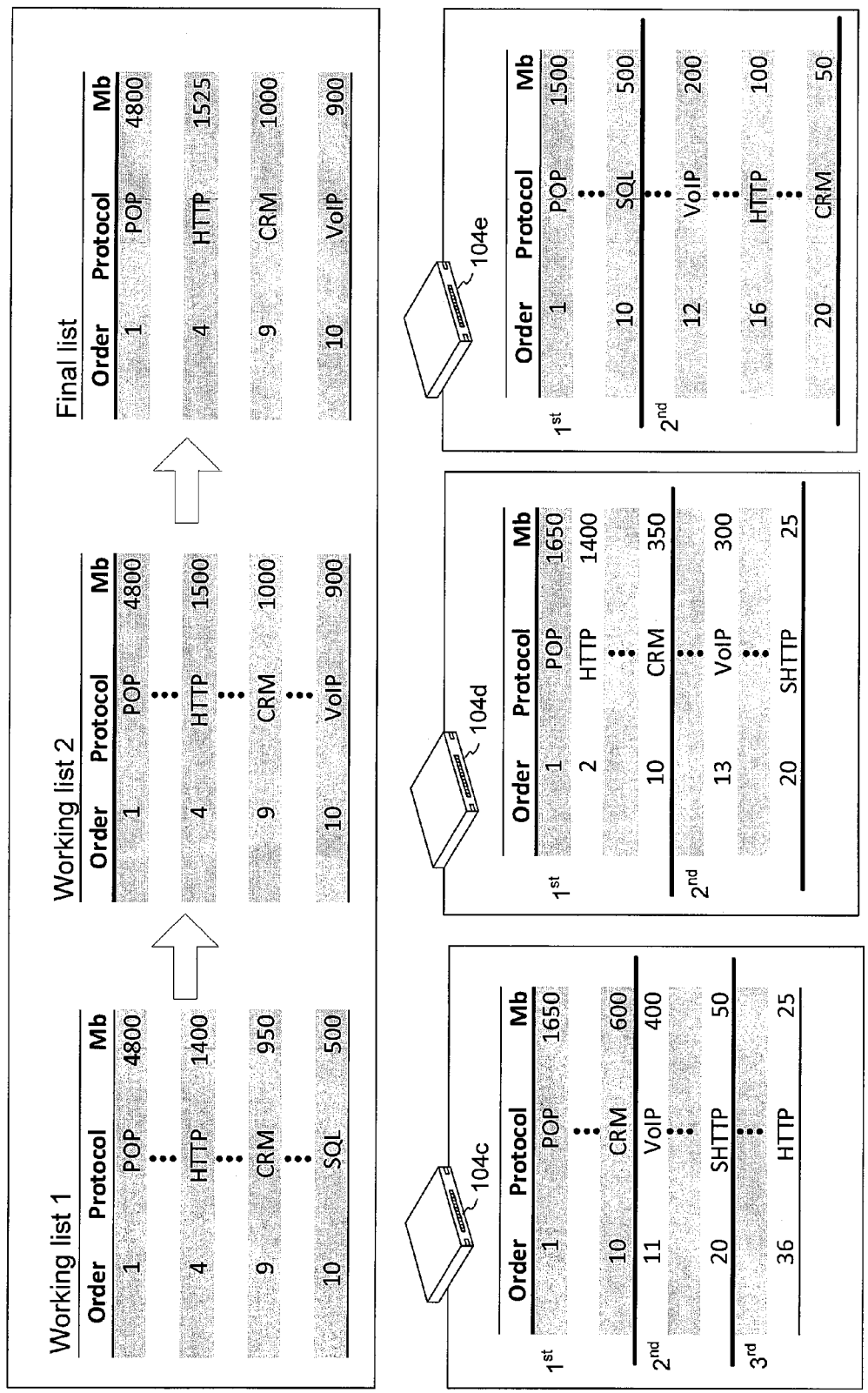
FIG. 3 is a block diagram illustrating an example report generation

A computer information system, like that illustrated in FIGS. 1a, 1b, and 2 may include a number of interconnected computing devices 106. For example, corporations, educational institutions, governments, individuals, and the like, may operate networks of computing device 106. The computing devices 106 may include workstation computers, networking equipment, server computers, and the like. Workstation computers may include desktop computers, laptop computers, personal digital assistants, smart phones, tablet PCs, and the like. Networking equipment may include hubs; bridges; switches; routers; network appliances such as firewalls, VPN appliances, Web proxies, etc.; Voice over Internet Protocol (VoIP) devices such as VoIP clients, VoIP gateways, VoIP proxies, etc.; and the like. Server computers may include business information servers, database servers, customer relationship management servers, web servers, document management servers, storage area networks systems, and the like. The computing devices 104 may be organized in a network such as a Local Area Network (LAN), Wide Area Network (WAN), Metropolitan Area Network (MAN), extranet, intranet, and internet network. For example, the computer information system 102 may be managed, owned, and/or operated by a commercial organization, a government organization, an educational organization, or the like.

Each of the computing devices 106 may provide performance data. Performance data may include any information indicative of a present and/or past observable aspect of operation. For example, the performance data may include CPU utilization, memory utilization, disk input-output utilization, disk storage capacity information, interface input-output utilization information, CPU process thread count, active/standby device status, jitter, latency, average round-trip time, bandwidth utilization, late and/or lost packet information, and packet out of sequence information, and the like.

The performance data may be indicative of collective activity across multiple computing devices. For example the performance data may include network flow performance data, such as NetFlow, Internet Protocol Flow Information eXport (IPFIX), and the like. The performance data indicative of network flow may include one or more of the following fields, version number, sequence number, input and/or output interface, timestamp, number of bytes and/or packets observed in the flow, layer 3 headers, information indicative of Transport Control Protocol (TCP) flags, layer 3 routing information, and the like. In some embodiments, Autonomous System (AS) number, Multiprotocol Label Switching (MPLS) label information, and/or Internet Protocol version six (IPv6) information, such as address and/or port information, may be included.

The network flow performance data may be generated at multiple sources and share one or more common key values, such as IP address, destination IP address, source port, destination port, IP protocol, ingress interface, IP type of service, and/or the like. By combining this network flow performance data from multiple sources, one can understand the flow of data in the computer information system 102. For example, once combined, the network flow performance data may provide insight into network traffic accounting, usage-based network billing, network planning, security, Denial of Service monitoring capabilities, network monitoring, information about network users and applications, peak usage times, traffic routing, and the like.

The performance data, including the network flow performance data, may be collected in a comprehensive fashion and/or a sampled fashion. In the sample fashion, the performance data is provided for every nth event, such as by time, count, packet, etc. The sampling period, n, may be a configured parameter.

The performance data may be received by a corresponding collector 104. The collector 104 may receive periodic performance data messages from the computing devices 104. The performance data may be formatted and transmitted/received via a network management protocol. For example, performance data may be formatted and transmitted/received via Simple Network Management Protocol (SNMP), proxy pinging, portshaker protocol, CISCO™ IOS IP Service Level Agreement protocol, and the like. The performance data may be formatted and transmitted/received via a custom protocol. For example, a script may be authored to enable the collector 104 to communicate via a custom protocol specific to one or more computing devices 106. The script may include computer executable code that when executed, properly formats, processes, and parses the specific performance data.

The performance data collected by the collectors 104 may be used to generate performance reports. The performance report may be any presentation of performance data. The performance report may include a chart, graph, and/or table based on the performance data. The performance report may include aggregated data, such as an overall network utilization report. The performance report may include performance data from one or more collectors 104. The performance report may include detailed troubleshooting data, such as a time series plot of CPU utilization for a specific group of computing devices. The report may include data that has been mathematically processed, such as averages, minimums, maximums, trend data, extrapolated data, polynomial fit data, sorted data, filtered data, and the like. For example, the performance reporting may be an application report, Internet Protocol report, network report, Quality of Service (QoS) report, or the like. The performance report may be a top-n or bottom-n report. To illustrate, a top-n report may include a report of top and/or bottom 'n' bandwidth usage by application, protocol, computer system, and the like.

Figure 1C:
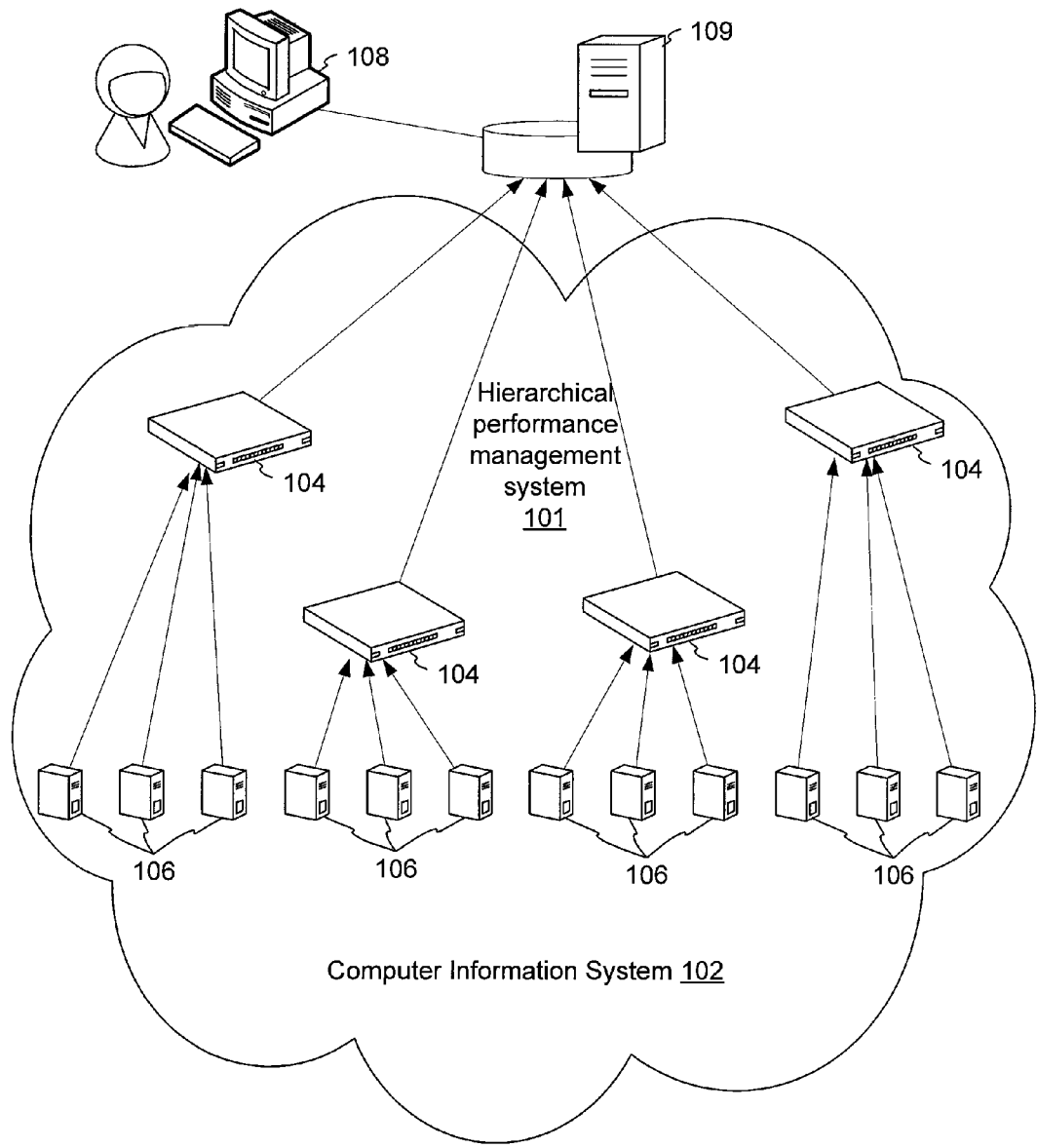

The collectors 104 may be organized in a peer-to-peer performance management system, such as that depicted in FIGS. 1a and 1b, and/or in a hierarchical performance management system, such as that depicted in FIG. 1c.

FIG. 1a is a block diagram of an example peer-to-peer performance management system 100. The collectors 104 may be organized as peers in a peer-to-peer architecture. For example, the collectors 104 may be networked such that each collector 104 is in communication with each other collector 104. The peer-to-peer architecture may present a logically flat topology of collectors 104. Each collector 104 may be a peer appliance. An user may operate the one or more collectors 104 via a user computer 108. The user computer may include browser software that enables a connection between the user computer and one or more of the collectors. A collector 104 may present a user interface via a Hypertext Transport Protocol (HTTP) session with the browser software of the user computer 108. The user may log into any of the collectors 104. The user may interact with the user interface. The user may view, add, edit, or remove configuration data. For example, the user may add new computing devices 104 to the performance management system 100, assigning them to a collector 104. For example, the user may move a computing device from one collector 104 to another. The user may add or remove a collector 104 from the performance management system 100. The user may require one or more performance reports from the peer-to-peer performance management system 100.

When the user requests a performance report, the collectors 104 of the peer-to-peer performance management system 100 may coordinate with each other to retrieve data identified by the subject matter of the performance report and to distribute the processing required for generation of the performance report.

FIG. 1b is a more detailed block diagram of an example peer-to-peer performance management system 100. As illustrated, a collector 104a may correspond to a first group 114 of computing devices 106 in a computing information system 102. A second collector 104b may correspond to a second group 118 of computing devices 106 in the computer information system 102. The first collector 104a may receive performance data from each of the computing devices 106 in the first group 204. The second collector 104b may receive performance data from each of the computing devices 106 in the second group 188. The first collector 112 may maintain first performance data 120 corresponding to the computing devices 106 in the first group 114. The second collector 116 may maintain second performance data 122 for computing devices 106 that correspond to the second group 118. FIG. 1b illustrates a system with two collectors 104a-b; however, the peer-to-peer performance management system 100 may be implemented with any number of collectors 104a-b.

The first collector 104a may maintain first mapping data 124. The first mapping data 124 may include information that describes the relationship between collectors 104a-b and computing devices 106. As illustrated, the first collector 104a may correspond to Devices A, B, and C (i.e., the computing devices 106 of the first group 114). The second collector 104b may correspond to Devices D, E, and F (i.e., the computing devices 106 of the second group 118). The first mapping data 124 may represent a logical topology of the performance management system 100. The first mapping data 124 may include data indicative of each computing device from which performance data is received and that computing device's corresponding collector 104a-b.

The first mapping data 124 may be stored in a database. The first mapping data 124 may be stored in the same database as the first performance data 120. The first mapping data 124 may be stored in a database separate from the first performance data 120.

The second collector 104b may maintain second mapping data 126. The second mapping data 126 may be a replicated copy of the first mapping data 124. The first mapping data 124 and the second mapping data 126 may be kept in synchrony according to a database replication process. For example, updates to the first mapping data 124 may be propagated to the second mapping data 126 via the database replication process. The first collector 104a may be designated as a primary source of mapping data. The database replication may maintain synchronized copies of the mapping data at each collector 104a-b in the performance management system 100. Thus, each collector 104a-b, via the mapping data, may have a current topology of the relationships between computing devices 106 and collectors 104a-b.

The user may log in to any collector 104a-b. When a user logs in to the collector 104a-b, it may be considered the originating (i.e., "local") collector for that session (for illustration purposes consider the first collector 104a as shown in FIG. 1b to be the local collector 104a). The local collector 104a presents the user with a user interface. The user interface may include a collection of dynamic webpages.

The user may request a performance report that implicates one or more computing devices 106. The local collector 104a may determine from the mapping data which collectors 104a-b (including itself) may be queried to obtain the data required for the report. For example, a user, logged in at the first collector 104a, may request that the daily average memory utilization for the past week for Device A and Device D be displayed. The first collector 104a may determine from the mapping data that Device A corresponds to the first collector 104a and the Device D corresponds to the second collector 104b. The local collector 104a may consider the nature of the report and determine what, if any, data manipulation process may be performed. The first collector 104a may determine a data manipulation process of daily average and a filter set to include the past week of memory utilization data is required for the report. The local collector 104a may process the report and present the results to the user.

FIG. 1c is a block diagram of an example hierarchical performance management system 101. In the hierarchical architecture, the collectors 104 may interact with the central server, responding to requests for performance data to be processed by the central server 109. A user may configure the system 101 and/or generate reports via the central server 109, either directly or indirectly, via the user computer 108. It may be appreciated that the central server 109 may include significant storage and processing resources.

FIG. 2 is an example process flow for providing a report of performance data. These activities may be performed in a peer-to-peer performance management system and/or a hierarchical performance management system. For example, the processing may be performed in at a local collector and/or central server, as illustrated in FIGS. 1b-c.

The performance report may implicate data distributed across multiple sources. The performance report may implicate a mathematical operation of the data distributed across multiple sources. The performance report may be such that the specific records of data to be included in the report is determined based on a mathematical calculation or relationship of a value stored in the records. For example, the performance report may include report of network flow, such as a top-n and/or bottom-n report, for example. Whether specific records are to be included in the report is determined based on whether a value and/or a sum of values fall within some bounds defined by the report.

To illustrate, in one in one method, a top-10 bandwidth usage by application report may be generated by considering all available records, summing the bandwidth values for those records with a common application, sorting the resultant sums, and displaying the first 10 results. This process may use a significant amount of memory and processing resources.

In another method, an iterative approach may be used to significantly reduce the amount of memory and processing resources to generate the report. The iterative approach may, in effect, reduce the number of record that are considered to ultimately uncover all the records for the report.

A request for a performance report may be received. In response to the request for a performance report, one or more requests for performance data may be sent to a plurality of sources. In turn, at 302, a respective subset of performance data records from each of a plurality of sources may be received.

At 304, whether additional performance data records are to be requested may be determined. For example, it may be determined whether any remaining data at each of the plurality of sources may be included in the report. Also for example, it may be determined if it is possible that any remaining data at any of the plurality of sources may ultimately be included in the report.

If additional performance data is required, additional data may be requested, and subsequently an additional subset of performance data may be received. For example, in a top-n report the subset of records may include a subset of records with the top values from each source. That subset of records may be summed and sorted into a "working" top-n list. Then, it may be determined whether the sum of each lowest-valued record received from each source exceeds a threshold, such as a value of the nth record in the working list. If the sum of each lowest-valued record received from each source does exceed the value of the nth record in the working list, there may be additional records remaining at the sources that, if included, would alter the constitution of the top-n report. In that case, additional performance data may be included in the report, and thus, additional performance data may be requested.

If additional performance data is not required, the report may be processed, formatted, and outputted, at 306. For example, the report may be generated in a viewable and/or storable electronic form. In an embodiment, a final request for information may include a request for any data that may result in minor modifications of the final report. For example, in a top-n report generation, an iterative process may results in an accurate listing of elements in top-n, but additional data may refine specific values associated with those elements. For example, in a final request, the whole or a portion of a working copy of the report data may be sent to one or more collectors requests any additional data that relates to the entries in the report. This last step, in effect, "cleans up" the report and may improve the accuracy of the reported values.

This iterative approach may be applied to generate a variety of reports.

The volume of the original and subsequent requests for performance data may be fixed, configurable, and/or based on the total volume of performance data in the system. For example, processing for a top-10 report may begin with a request to each collector for their respective top-10s, and each subsequent request may include 10 additional records. One may appreciate that any suitable number of records may be requested based on the size of the system, the nature of the report being generated, and historical experience with similar report generation. Requests for larger sets of records may result in a faster convergence on the final report and may use more memory than requests for smaller sets of records.

Figure 4:
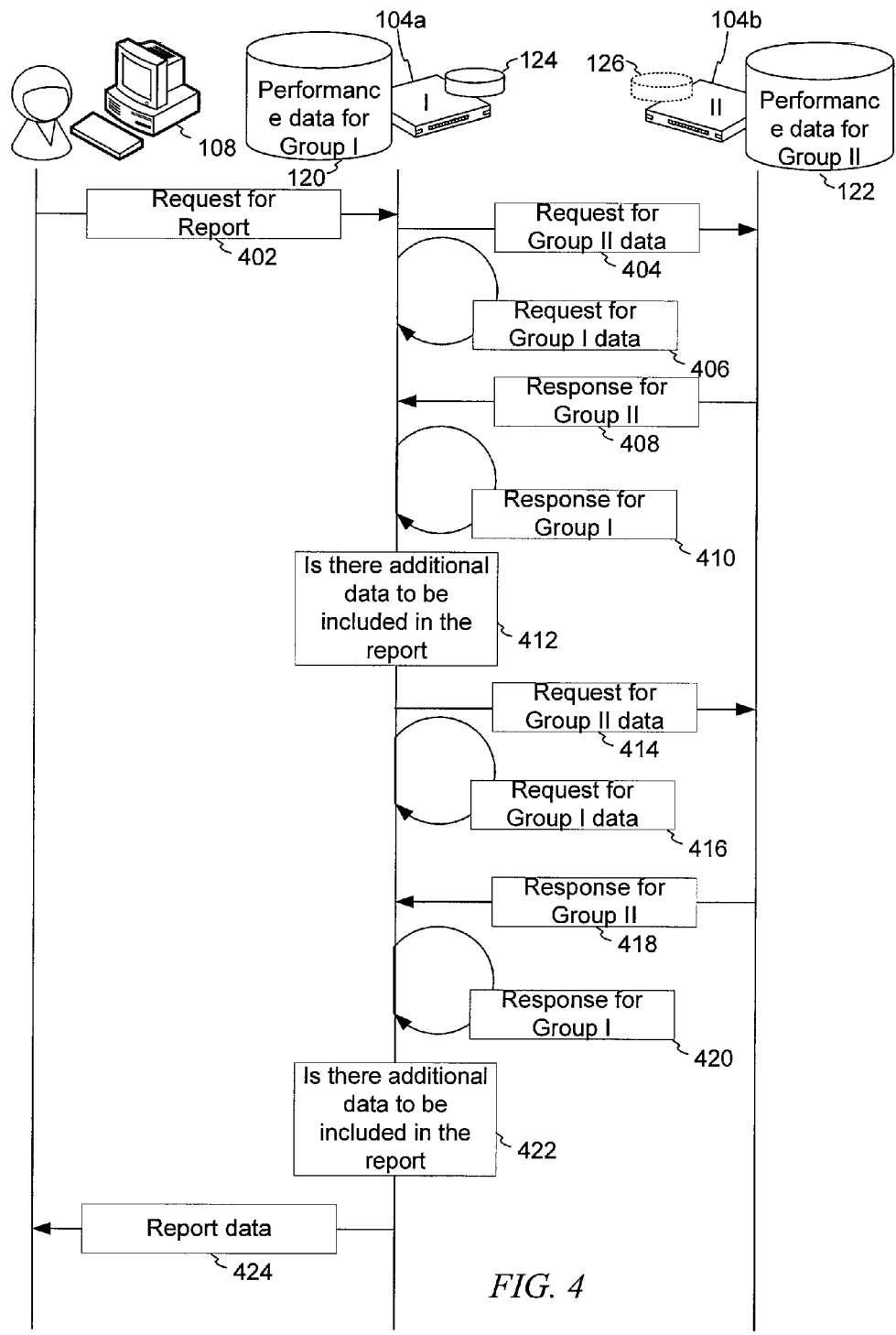
FIG. 4 is an example message flow for processing a report request in a peer-to-peer performance management system.

FIG. 4 is an illustrative example of a top-10 report processing. In this illustration, a top-10 bandwidth usage report by application is being generated based on network flow performance data from three collectors 104c-e. The report processing may be performed by a central server 109 and/or a local collector 104a, as show in FIGS. 1b-c. In this illustration, the local collector may be any of the collectors 104c-e.

In response to a request for the report, each collector is requested to provide a respective subset of the performance data. In this illustration, each collector orders its respective bandwidth usage records and provides its respective top-10 records by value. This illustration shows certain relevant values to demonstrate a process for generating a report. For example, the first collector 104c provides a subset of records that indicate that 1650 Megabits (Mb) have been recorded for the Post Office Protocol (POP) application and 600 Mb have been recorded for the Customer Relationship Management (CRM) application at the first collector 104c. The second collector 104d provides subset of records that indicate that 1650 Mb have been recorded for the POP application, 1400 Mb have been recorded for the Hypertext Transfer Protocol (HTTP) application, and 350 Mb have been recorded for the CRM application, at the second collector 104*d*. The third collector 104*e* provides a subset of records that indicate that 1500 Mb have been recorded for the POP application and 500 Mb have been recorded for the Structured Query Language (SQL) application.

This first respective subsets of performance data is processed into a first working list. The common values are summed, and the resultant records are ordered. In this illustration, the first working list contains the POP application with 4800 Mb (i.e., the sum of 1650, 1650, and 1500), the HTTP application with 1400 Mb (i.e., the one value for HTTP which was received from the second collector 104*d*), the CRM application with 950 Mb (i.e., the sum of 600 and 350), and the SQL application with 500 Mb (i.e., the one value for SQL which was received from the third collector 104*e*).

At this point, it is determined whether there are additional records that may be included in the report. It may be determined that it is possible for there to be other performance data records that would change the constitution of the report. For example, if the sum of the least value received from each of the collectors 104*c-e* exceeds that of the $10^{th}$ record in the working list, it is possible that for there to be other performance data records that would change which applications are in the top-10 list.

In this illustration, the sum of the least values received from each of the collectors 104*c-e* is 1450 (i.e., the sum of 600, 350, 500) does exceed value of the $10^{th}$ record in the working list (i.e., 500). Thus, it is possible that other data records not yet sent for processing may alter which applications ultimately are in the top-10. This is illustrated by the Voice of Internet Protocol (VoIP) application, which has 400 Mb at the first collector 104*c*, 300 at the second collector 104*d*, and 200 Mb at the third collector 104*e*. In this illustration, none of the VoIP values were high enough individually to be included in the first subset of data sent to be processed for inclusion in the top-10 list, but their sum warrants a position for VoIP in the overall top 10.

Because additional data at the collectors may be included in the report, additional data may be requests from one or more of the collectors. For example, a second subset of data may be requested from the collectors and subsequently received for processing.

In this illustration, the second subset may include the applications with the next 10 highest values. For example, the first collector 104*c* provides a subset of records that indicate that 400 Mb have been recorded for the VoIP application and 50 Mb have been recorded for the Secure Hypertext Transport Protocol (SHTTP) application at the first collector 104*c*. The second collector 104*d* provides subset of records that indicate that 300 Mb have been recorded for the VoIP application and 25 Mb have been recorded for the SHTTP application, at the second collector 104*d*. The third collector 104*e* provides a subset of records that indicate that 200 Mb have been recorded for the VoIP application, that 100 Mb have been recorded for the HTTP application, and 50 Mb have been recorded for the CRM application.

This second respective subsets of performance data is processed to update the first working list. The common values are summed, and the resultant records are ordered. In this illustration, the updated, second working list contains the POP application with 4800 Mb (i.e., unchanged from the first working list), the HTTP application with 1500 Mb (i.e., the original 1400 together with the additional 100 from the third collector), and the CRM application with 1000 Mb (i.e., the original 950 together with the additional 50 from the third collector). The updates list no longer contains an entry for SQL in the top-10, because it has been supplanted by the 900 Mb associated with the VoIP application (i.e., 400 from the first collector, 300 from the second collector, and 200 from the third collector).

The process may be iterative, and again consider whether there are additional records that may change the constitution of the report. Looking again at whether the sum of the least value received from each of the collectors 104*c-e* exceeds that of the $10^{th}$ record in the working list, in this illustration, it is no longer possible for there to be additional data that would change the makeup of the applications listed in the report. The sum of the least value received from each of the collectors (i.e., 50 for SHTTP from the first collector, 25 for SHTTP from the second collector, and 50 for CRM from the third collector) is 125, which is less than the value of the $10^{th}$ record in the working list (i.e., VoIP at 900). Even if the next record for each collector was for the same application, that application would still not "brake into" the top-10 overall. At this point, one may be confident that no additional performance data will change the constitution of the top-10 list.

Optionally, the second working list may be finalized by requesting that the collectors report any data that matches the applications in the top-10 list. This data may be used to provide accurate values for the items in the top-10 list. To illustrate this process, the first collector has a record of 25 Mb for the HTTP application. Because this value was small (i.e., in $36^{th}$ place for the collector), it was not previously reported in the first or second subsets. However, in this corrective request to finalize the top-10 list, this data may be sent and included into the ultimate value listed in the report for HTTP. As illustrated, the second working list is finalized to include the additional 25 Mb from the first collector, setting the HTTP value in the final list at 1525 Mb. At this point, the final list contains an accurate representation of the top-10 applications and their respective bandwidths.

The iterative nature of the report generation process enables a linearly scalable reporting system. Generally, as a computer network grows, the volume of performance data, such as network flow performance data, grows as well. Here, the processing, memory, and bandwidth requirements to generate the report is lessened in light of a subset of the entire performance data being is collected. As illustrated, the top 20 records from each collector and one additional record from the first collector was used to generate an accurate top-10 list. Other records (i.e., those that fell below the top 20 for each collector and those that were not ultimately requested in the final request) were not transported and processed to generate the report. This iterative process, in effect, distributes the processing and storage required for generating reports and minimizes the amount of communication between devices, reducing the overall computing overhead associated with report generation.

FIG. 4 is an example message flow for processing a performance report request in a peer-to-peer performance management system. One will appreciate that a similar flow may apply to processing a performance report request in a hierarchical performance management system, where the report processing logic at the first collector 104*a* is performed by a central server.

At 402, a user may make a request for a performance report. The request may be sent to the first collector 104*a*. To illustrate, the user may request a "top ten most-utilized applications" report. This report would present a listing of the top most-utilized application across the network, based on network flow performance data for example.

Upon receipt of the request for the report, the collector 104*a* may consult its replicated copy of the mapping data (i.e., the first mapping data 124) to determine which collectors 104*a-b* maintain the performance data required to complete the request for the report. For purposes of this illustration, two collectors, the first collector 104*a* and the second collector 104*b* have performance data associated with the report. One will appreciate that any number of collectors may have data associated with the report.

The first collector 104*a* may determine what data manipulation process is required, if any. The data manipulation process may include a sorting and filtering operation that selects the top ten most utilized applications from the group of computing devices. For example, the data manipulation process may include ordering the applications by bandwidth volume and partitioning the ordered list at a first subset of the records, such as the first 10 records of the ordered list, for example.

At 404, the first collector 104*a* may send a remote request for performance data to the second collector 104*b*. The remote request may indicate the data related to the report and any data manipulation process required for the report.

At 406, the first collector 104*a* may query itself. This local request also may specify the data related to the report and any data manipulation process required for the report. Thus, both the first collector 104*a* and the second collector 104*b*, in this example, may share the processing required for the report.

At 408, upon completion of the processing of the performance data, the second collector 104*b* may return performance data to the first collector 104*a*. This performance data may represent an output of the data manipulation process indicated in the request (e.g., a subset of the records indicating the most-utilized applications).

Similarly, at 410, the first collector 104*a* may return to itself performance data as well that is responsive to the request 406.

The local and remote requests at 406 and 404 may occur in series or in parallel. For example, the local request at 406 may be sent after having received data associated with the remote request at 404. The local request at 406 may be sent at the same time as the remote request at 406. Generally, parallel requests may reduce the overall delay in providing a report to the user.

Upon receipt of the performance data from the second collector 104*b* and from itself, the first collector 104*a* may generate a working report based on the received performance data. At 412, the first collector 104*a* may determine whether additional data is to be included in the report. For example, in a top-n report, the first collector 104*a* may determine that additional data may be included in the report when the sum of the least value received from each collector 104*a-b* exceeds the nth value of the working top-n report. Also for example, in a top-n report, the first collector 104*a* may determine that additional data may be included in the report when data for applications listed in stable report has not yet been received and/or requests for each collector 104*a-b*.

In this illustration, the first collector 104*a* determines that additional data may be included in the report, and the first collector requests the additional data from the second collector 104*b*, at 414, and from itself, at 416. The requests may be included a requests for the subsequent 10 records from the collectors' respective ordered lists. In response to the requests, the second collector 104*b* and the first collector 104*a* respond at 418 and 420 with additional performance data. The first collector 104*a* incorporates this additional data into an updated working list.

At 422, the first collector 104*a* continues the iterative process by again determining whether additional data may be included in the report. In this illustration, it is determined that no further data may be included in the report, and at 424, the first collector 104*a* presents the performance report to the user.

Figure 5:
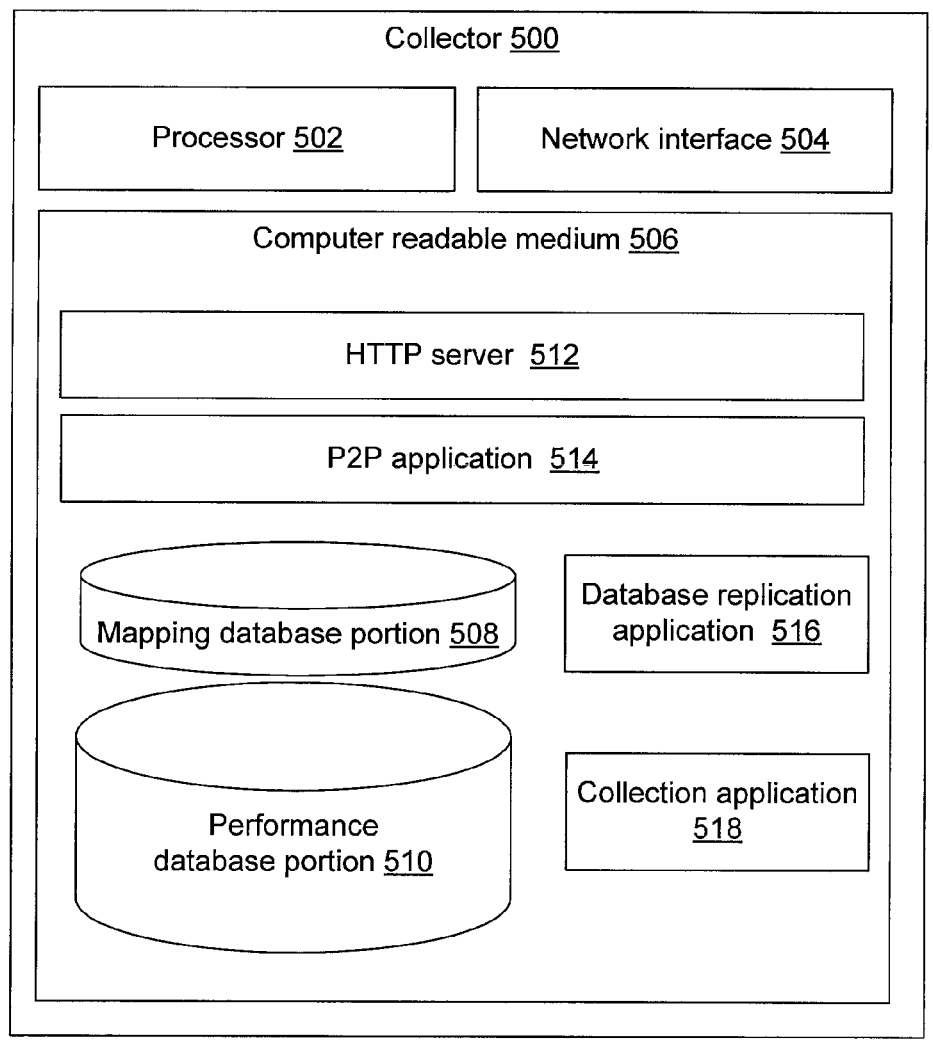
FIG. 5 is a block diagram of an example computing device for collecting performance data and/or generating a report.

FIG. 5 is a block diagram of an example collector 500. The collector 500 may include a processor 502, a network interface 504, and/or a computer readable storage medium 506. The collector 500 may be a low-profile, rack-mountable server computer, a blade server, or the like. The processor 502 may be any device, system, or subsystem suitable for processing information such as a microprocessor, parallel processor, microcontroller, or the like. The network interface 504 may be any device, system, or subsystem to provide network communication. The network interface 504 may provide communication from the collector 500 to other devices such as computing devices, other collectors, a user's computer, a central server, and/or the like. The network interface 504 may include an Ethernet interface, Gigabit Ethernet interface, fiber channel interface, token-ring interface, FDDI interface, wireless Ethernet, and the like.

The network interface 504 may enable communication between the collector 500 and the corresponding computing devices that the collector 500 monitors. The collector 500 may use the network interface 504 to send polling messages to the computing devices and to receive performance data from the computing devices. The network interface 504 may be configured with an open-port to receive periodic performance data from the computing devices. network interface 504 may be used to send and receive data to and from other peer appliances in the performance management system.

The computer readable medium 506 may include any device, system or subsystem suitable for storing and retrieving information. For example, the computer readable medium 506 may include random access memory, read-only memory, flash memory, magnetic storage memory, optical storage memory, a storage area network (SAN), or the like. The computer readable medium 506 may be a combination of random access memory and magnetic storage hard disk memory. The computer readable medium 506 may be a computer readable storage medium, such that it is suitable for non-transitory (i.e., non-volatile) storage.

In a hierarchal performance management system, the computer readable medium 506 may have stored therein a collection application 518, a performance database 510, and/or a distribution application, not shown, (e.g. to interact with a central server). In a peer-to-peer performance management system, the computer readable medium 506 may have stored therein a mapping database 508 and a performance database 510, the computer executable code for a Hypertext Transport Protocol (HTTP) server 512, a peer-to-peer application 514, a database replication application 516, and/or a collection application 518.

The mapping database 516 and the performance database 410 may be in separate databases. The mapping database 516 and the performance database may be in the same database. The database or databases may include an ORACLE™ database, a MYSQL™ database, a D-BASE™ database, or the like.

The mapping database 508 may maintain information describing the topology relationship between collectors and computing devices in the performance management system. The mapping database 508 may be updated whenever computing devices are added to, removed from, or moved within the performance management system. The mapping database 508 may maintain the data required for a peer device to determine which other collector to contact for data related to any computing device in the performance management system.

The mapping database 508 may interface with the database replication application 516. The database replication application 516 may maintain the mapping database 508 in synchrony with one or more copies of the mapping database 508 at other collectors. The database replication application 516 may provide active and/or passive database replication. The database replication application 516 may be a component of a database management system or a standalone application.

In an example peer-to-peer performance management system, one collector 500 may be designated as a "primary." Every other collector 500 in the example performance management system may be designated as a "replicated copy." In this example, the collector 500 may be programmed such that new changes to the mapping data are transacted at the primary database, and that read-only transactions are conducted locally. To illustrate, when a new computing device is added to the computer information system, information about the new computing device and the collector 500 to which it is assigned may be entered and/or transferred to the primary collector 500. This data is entered at the mapping database 508 of the primary collector 500. Detecting the change at the mapping database 508, the replication application may propagate the change to every other collector 500 in the performance management system. Thus, subsequent requests for reports that consult the mapping database, at any collector 500, will have the most up-to-date topological view of the mapping between computing devices and collectors 500. A similar process may be employed for moving computing devices from one collector 500 to another, for removing computing devices, and/or for adding and removing collectors 500.

The performance database 510 may maintain a collection of performance data received from computing devices. Each collector 500 may be associated with a subset of computing devices, and each performance database 510 may maintain the performance data that corresponds to the computing devices to which the collector 500 is associated. The performance data may be stored at any level of granularity that is provided by the computing devices. Storage capacity in the performance management system may be added by increasing the number of collectors 500 in the performance management system. Since each collector 500 provides the processing for its own data, processing bottlenecks may be avoided.

The performance database 510 may interface with the collection application 518. The collection application 518 may provide management of the various polling and network management protocols required to collect performance data from the computing devices. The collection application 518 may maintain a session with the performance database 510. The collection application 518 may receive performance data from the computing devices and store the performance data at the performance database 510. The collection application 518 may include timing data, data formatting, and metadata, such as a device identifier when storing the received performance data in the performance database 510.

The collection application 518 may be configured to correspond with the various network management protocols supported by the individual computing devices. The collection application 518 may include a script processing module that enables it to interface with nonstandard network management protocols. For example, a script may be authored to correspond to a nonstandard network management protocol. The collection application 418 may consult the script to establish communication via the nonstandard network management protocol. The performance data collected from the individual computing devices may be stored in the performance database 510.

The peer-to-peer application 514 may be executed in connection with the processor 502 causing the processor to perform the instructions indentified by the peer-to-peer application 514. The peer-to-peer application 514 may include computer executable instructions that generate user interface screens, handle configuration tasks, manage report generation and processing, and interact with other components of the performance management system. The peer-to-peer application 514 may include a series of user interface screens that may be presented to the user via a text based terminal, via a local monitor and keyboard, and/or via the Hypertext Transport Protocol (HTTP) server to a web browser software at a user's client computer. For example, the peer-to-peer application 514 may include interactive user interface screens such as a device browser interface (e.g., for adding/removing computing devices), a system summary interface, a performance data policy editor interface (e.g., for configuration of what performance data is to be requested/received), a threshold alarm editor interface, and/or other interface screens to implement user control of the various features of the performance management system.

The peer-to-peer application 514 may maintain rules associated with the operational aspects of the performance management system. The peer-to-peer application 514 may maintain rules associated with various report formulations. The peer-to-peer application 514 may maintain rules associated with various configuration information changes. For example, the peer-to-peer application 514 may require either a "removal" or a "move" of every computing device associated with a collector 500 when that collector 500 is removed from the performance management system. The peer-to-peer application 514 may ensure that configuration changes are made at the primary collector 500 consistent with the mapping data replication process.

The peer-to-peer application 514 may process requests for reports. The reports may include summary information, graphs, charts, tables, and the like. The peer-to-peer application 514 may enable reports to be grouped any category of data within the performance management system, such as grouping by device type (e.g., all routers), by type of performance data (e.g., all CPU utilization data), by date/time range, by device location (i.e., all U.S.-based equipment), and the like.

The peer-to-peer application 514 may provide one or more standard reports, such as application reports, Internet Protocol reports, network utilization reports, specific protocol reports (i.e., HTTP performance), Quality of Service (QoS) reports, top and/or bottom 'n' network flow report, and the like. The peer-to-peer application 514 may provide functionality for the user to create custom reports. The peer-to-peer application 514 may enable graphical representation of custom reports such as, line graphs stacked line graphs, pie graphs, and the like. The peer-to-peer application 514 may enable reports to be exported to a local file, such as a portable document file (PDF), a comma separated value (CSV) file, and the like.

The peer-to-peer application 514 may provide analysis tools associated with the performance reports. For example, the peer-to-peer application 514 may present reports that include trending, such regression analysis, polynomial fit analysis, and the like. The peer-to-peer application 514 may provide average, maximum, minimum, and differential (e.g., week-over-week difference) data points. The peer-to-peer application 514 may provide busy-hour analysis for capacity planning.

Enabled by very granular performance data, drill-down report functions are available to the user. For example, a report that shows daily values of CPU utilization across a given computing device may be drilled down on a given day to show an hour by hour and/or minute-by-minute CPU utilization of that computing device. The user may select a portion of data in a given report and request that more detailed information about the selection be provided. Drilling-down into a report may include generating a new report at the drilled-down level. In response to a drill-down request, the peer-to-peer application 514 may generate a request for a new report that corresponds to the level of detailed indicated in the user's drill-down request.

The peer-to-peer application 514 may enable an alerts/alarms interface that displays current active messages in the system. These messages may include threshold violations, trap notifications, errors, and the like. The alerts/alarms interface may be automatically updated. The alerts/alarms interface may display a table of individual messages. For example, each row may include a message identifier, an identifier of the computing device with which the message is associated, the criticality of the message (e.g., emergency, alert, critical, error, warning, debug, etc.), and the message itself. Each row may be color-coded in accordance with the criticality. The alerts/alarms interface may enable filtering and sorting.

The message information associated with the alerts/alarms interface may be stored in the mapping database 508 and replicated throughout the performance management system. Because alerts tend to be critical, time-sensitive items, including them in the mapping database 508 helps ensure that the alert messages are always replicated at any collector 500 and that a local query to the mapping database at any collector 500 is sufficient to present the alerts/alarms interface to the user for messages across the entire performance management system.

The HTTP server 512 may include computer executable instructions that when executed send and/or receive data. The HTTP server 512 may communicate with a web browser software at a client computer. The HTTP server 512 may be a web server. The HTTP server 512 may enable user interfaces generated by the peer-to-peer application 514 to be presented via client computer's web browser software. The HTTP server 512 may receive interactive requests from the user. The HTTP server 512 may present data from the user to the peer-to-peer application 514 for processing.

Figure 6:
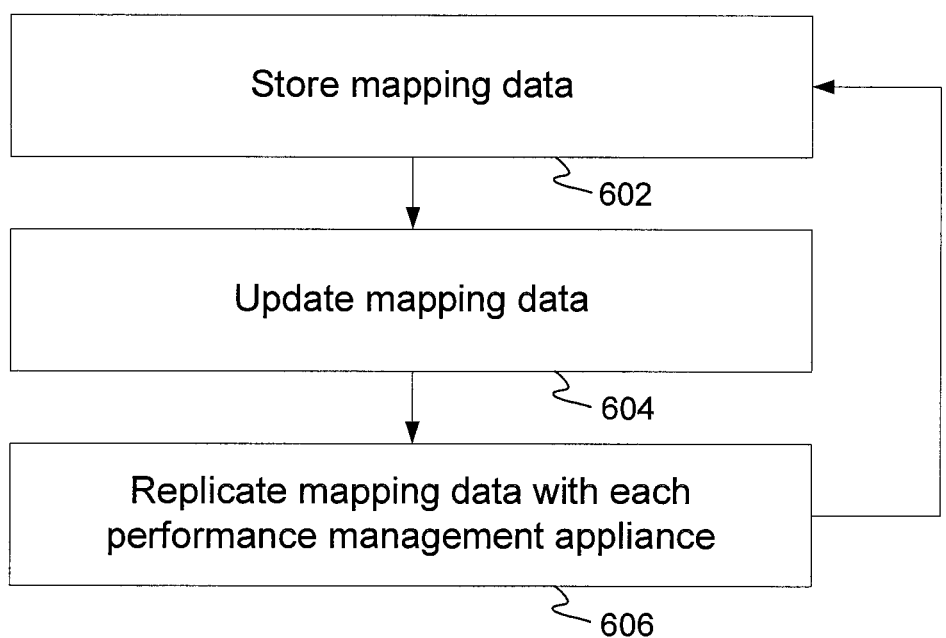
FIG. 6 is a flow chart of an example process for managing mapping data in a peer-to-peer performance management system.

FIG. 6 is a flow chart of an example process for managing mapping data. At 602, mapping data may be stored. The mapping data may be stored in a mapping database in individual collectors. The mapping data may be stored from input by a user. The mapping data may be stored from input from a replication process. For example, when a performance management system is first deployed, a user may enter mapping data into the mapping database. The user may assign computing devices to corresponding peer appliances, storing that information in the mapping database.

The mapping data may be automatically populated as part of an automatic discovery process. For example, the peer appliances may scan a network to identify collectors and computing devices. A listing of the identified peer appliances and computing devices may be presented to the user. The user may edit the list, add additional information, and store the resulting mapping data. The scan may include an IP address range scan, a port scan, an Address Resolution Protocol (ARP) scan, or the like.

At 604, the mapping data may be updated. The mapping data may be updated over time, for example, when new collectors are added and/or removed, when computing devices are added and/or removed, and/or when the relationship between computing devices and collectors changes. To illustrate, a computing device may be moved from one location to another location in the computer information system. A technician may update the mapping data to reflect the new location, including reassigning the computing device to a different peer appliance.

In an embodiment, updating the mapping data may include sending the updated mapping data to a collector that has been designated as a primary collector. When a user makes a change to mapping data at a non-primary peer appliance, the mapping data change may be sent to the primary peer appliance to facilitate replication.

At 606, the updated change to the mapping data may be replicated across the performance management system. A database replication process may detect a change in mapping data at any collector. The database replication process may send that change to every other collector such that the mapping data database at each peer appliance may be kept in synchrony.

For example, a collector may be designated as a primary such that each other collector maintains a copy of the mapping data at the primary. Changes may be funneled to the primary collector and consistently replicated across the performance management system. Thus, the performance management system may maintain current mapping information in the respective mapping database in each collector. This process of storing updating and replicating may loop during normal operation of the performance management system.

Figure 7:
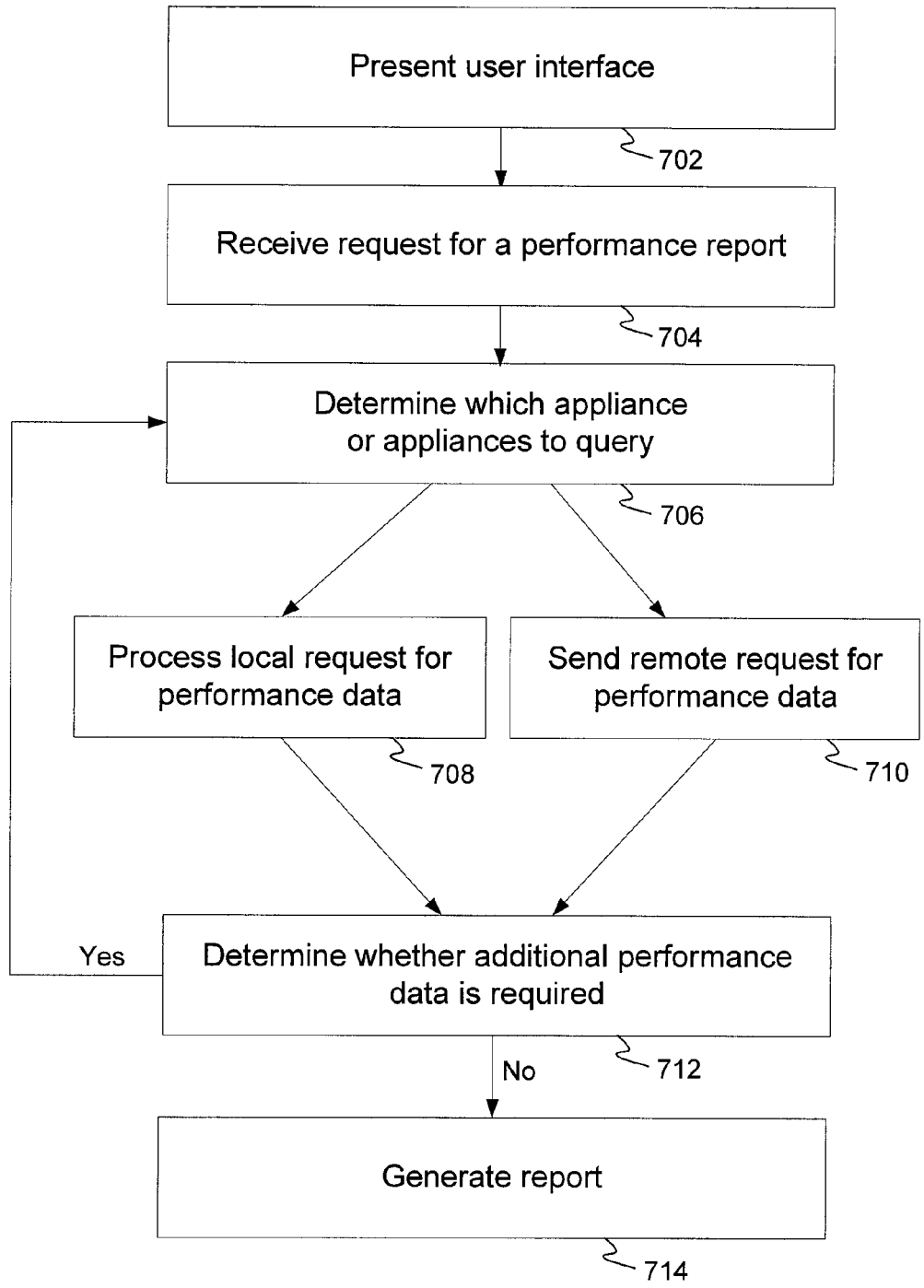
FIG. 7 is a flow chart of an example process for retrieving data and generating a report in a peer-to-peer performance management system.

FIG. 7 is a flow chart of an example process for fulfilling a performance report request in a peer-to-peer performance management system. At 702, a user interface may be presented to a user. A collector in the performance management system may present the user interface to the user. For example, the user may login to any collector via a web connection.

The user may, via the user interface, request a performance report. At 704, the collector may receive the request for the performance report. The performance report may implicate the performance data corresponding to one or more computing devices across one or more collectors, which may or may not include the collector providing the user interface to the user. The performance report may require one or more data manipulation processes to be performed, such as filtering, sorting, mathematical processing (e.g., average, maximum, minimum, trending, summing, etc.), truncating, matching, and the like.

At 706, the collector may analyze the characteristics of the requested report and may determine which other appliance or appliances are required to generate the report. The collector may determine what data is required for the report and what data manipulation processes may be required for the report. The collector may consult the mapping database to determine which collectors host the computing devices implicated by the performance report. For example, the performance report may implicate all wireless routers. The collector may determine from the mapping data which collectors are associated with wireless routers. The collector may identify what data manipulation processes are required of each of these collectors. The collector may formulate requests for data to each identified collector. The request may identify the required data and data manipulation processes.

To illustrate, the requested performance report may implicate performance data resident at the collector serving the user interface and other peer appliances. At 708, a local request for performance data may be processed. At 710, a remote request for performance data may be sent. The local request at 708 and the remote requests 710 may occur parallel. The local request at 708 and the remote requests 710 may occur in series.

The local and remote requests may be processed by the respective collectors. Each collector may query its performance database in accordance with the request. Each collector may perform any data manipulation process identified by the request. The result of the data query and the data manipulation process may include intermediate data that is returned for further processing into a report for the user.

At 712, the responses from the collectors may be received and processed. The collector receiving this data may process it to determine whether additional performance data may be needed for the report (i.e., additional performance data may be included in the report). If additional data may be needed, the data request process is repeated until all the data needed for the report is received.

At 714, the report may be generated at the user interface for the user to view. The report may include interactive elements such as drill-down features, enabling the user to request additional data.

What is claimed:

1. A computer implemented method for responding to a request for a report, comprising:
    a first system receiving a request for a report that identifies performance satisfying particular criteria;
    the first system querying mapping data comprised therein to identify that the first system collects and has stored thereon first performance data responsive to the requested report, and at least a second system collects and has stored thereon second performance data responsive to the requested report;
    the first system querying the first performance data and retrieving data regarding performance satisfying the particular criteria, the retrieved data comprising a subset of the first performance data;
    the first system transmitting to the at least a second system a request for a subset of data from the second performance data regarding performance satisfying the particular criteria;
    the first system, in response to the request, receiving from the second system data regarding performance satisfying the particular criteria;
    the first system determining, based upon the retrieved data regarding performance satisfying the particular criteria from the first system and the received data regarding performance satisfying the particular criteria from the at least a second system, prior to outputting the report, whether additional data regarding performance satisfying the particular criteria possibly exists on the first system or the at least a second system;
    the first system, upon determining additional data regarding performance satisfying the particular criteria possibly exists on the first system or the at least a second system, performing at least one of:
        querying the first system for additional data regarding performance satisfying the particular criteria; and
        transmitting a request to the at least a second system for additional data regarding performance satisfying the particular criteria; and
    the first system generating the requested report using data retrieved from the first system and received from the at least a second system.

2. The computer-implemented method of claim 1, wherein said determining whether additional computing data regarding performance satisfying that may the particular criteria possibly exists comprises determining whether values of data retrieved from the first system and values of data received from the at least second system indicate additional computing data regarding performance satisfying the particular criteria exist on the first system or the at least a second system.

3. The computer-implemented method of claim 1, wherein said determining whether additional computing data regarding performance satisfying the particular criteria possibly exists comprises determining whether the retrieved data and the received data indicate that additional data from the first system or the at least a second system exceed a threshold value derived from the retrieved data regarding performance satisfying the particular criteria, and the received data regarding performance satisfying the particular criteria.

4. The computer-implemented method of claim 1, wherein the retrieved data regarding performance comprises performance records and the received data regarding performance comprises performance records and each performance record comprises a respective value, the method further comprising compiling a list of performance records and ordering the list by respective value.

5. The computer-implemented method of claim 4, wherein said determining whether additional computing data regarding performance satisfying the particular criteria possibly exists comprises determining whether a sum of respective values from performance records of each of the first system and the at least a second system exceeds a threshold.

6. The computer-implemented method of claim 5, wherein the threshold is the value of the nth record of the list.

7. The computer-implemented method of claim 6, wherein the requested report is a top-n report.

8. The computer-implemented method of claim 6, wherein the requested report is a bottom-n report.

9. The computer-implemented method of claim 5,
    wherein the first system querying the first performance data comprises querying the first performance for a set of top ten values satisfying the particular criteria; and
    wherein transmitting to the at least a second system a request for data regarding performance satisfying the particular criteria comprises transmitting a request for a set of top ten values satisfying the particular criteria.

10. The computer-implemented method of claim 5, further comprising receiving additional data from the at least a second system, and updating the list to reflect values for performance records in the received additional data.

11. The computer-implemented method of claim 1, wherein the data regarding performance comprises data regarding netflow.

12. A computing system, comprising:
    a computing processor; and
    computing memory communicatively coupled with the computing processor,
        the computing memory having stored therein mapping data identifying a plurality of systems and for each of the plurality of systems identifying performance data stored thereon,
        the computing memory further having stored therein computer executable instructions that when executed cause the computing system to perform operations comprising:
            receiving at the computing system a request to generate a report on performance;
            the computing system querying the mapping data to identify a plurality of systems having performance data responsive to the request to generate a report;
            the computing system transmitting a request for performance records to the identified plurality of systems;

receiving at the computing system a respective subset of performance data records from each of the identified plurality of systems for the requested report, each record comprising a respective value;

the computing system compiling an ordered list of received records by value;

the computing system determining, prior to outputting the report, whether additional performance data records are to be requested from at least one of the plurality of systems for the requested report by determining whether a value derived from records received from the plurality of systems exceeds a threshold;

the computing system requesting and receiving additional performance records from one or more of the plurality of systems and updating the ordered list; and outputting the requested report based on the updated ordered list.

13. The computing system of claim 12, wherein each respective subset of performance data records are ordered by value.

14. The computing system of claim 12, wherein said determining whether a value derived from records received from the plurality of systems exceeds a threshold comprises determining whether the sum of each lowest-valued record received from each system passes a threshold.

15. The computing system of claim 14, wherein the threshold is the value of the nth record of the list.

16. The computing system of claim 15, wherein the requested report is a top-n report.

17. The computing system of claim 15, wherein the requested report is a bottom-n report.

18. The computing system of claim 12, wherein the performance data records are indicative of netflow.

19. A computer-implemented method, comprising:

a computing system receiving a request to generate a report on performance with particular characteristics, the computing system comprising mapping data identifying a plurality of systems and for each of the plurality of systems identifying performance data collected and stored thereon;

the computing system querying the mapping data to identify a plurality of systems having performance data responsive to the request to generate a report;

the computing system transmitting a request for performance data to the identified plurality of systems;

receiving at the computing system a respective subset of performance data records from each of the identified plurality of systems, each record comprising a respective value, each respective subset of performance data records being ordered by value;

the computing system compiling an ordered list of received records by value;

the computing system determining, prior to outputting the report, whether additional performance data records are to be requested from the plurality of systems by determining whether a sum of each lowest-valued record received from each of the identified plurality of systems exceeds a particular value record in the ordered list;

the computing system requesting and receiving additional performance records from one or more of the identified plurality of systems and updating the ordered list; and outputting the report based on the updated ordered list.

* * * * *